May 6, 1969      B. L. LEWIS      3,443,098
ELECTROSTATICALLY CONTROLLED LIGHT MODULATOR
Filed Oct. 21, 1965
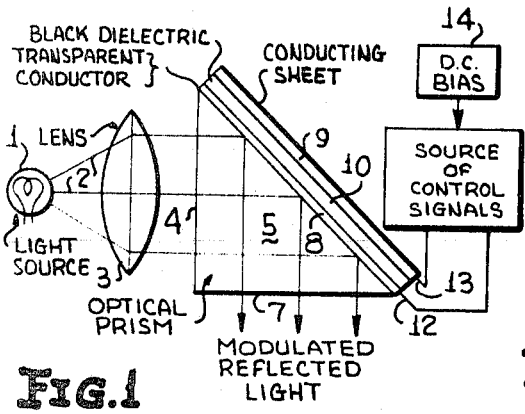
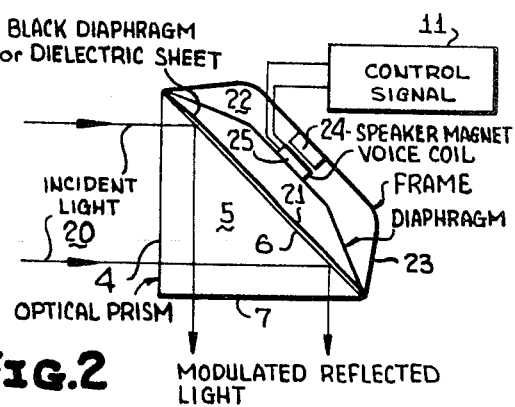
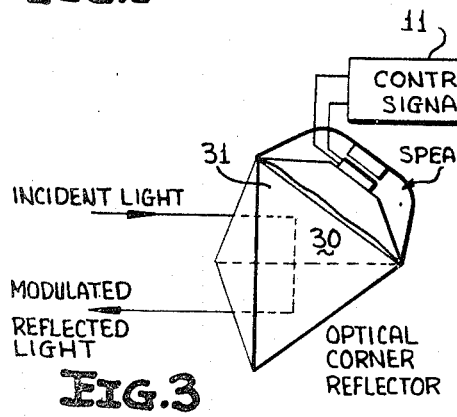
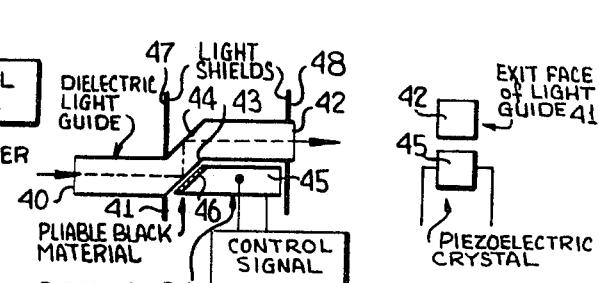
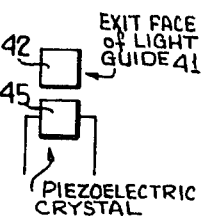
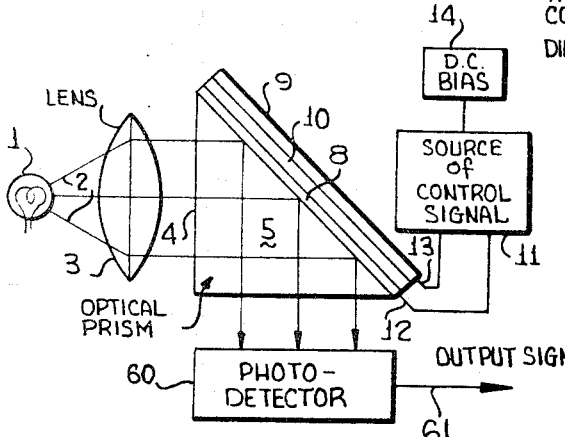
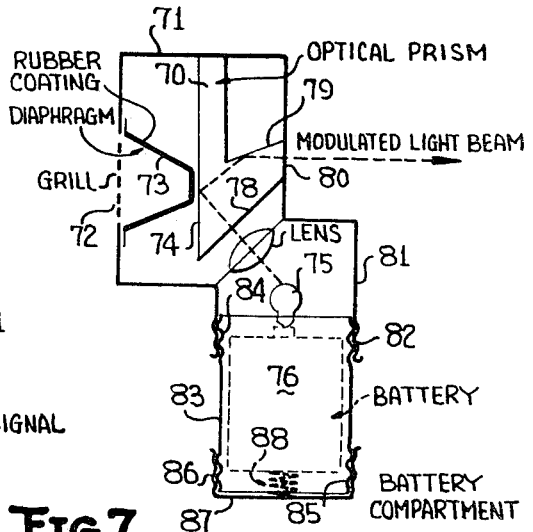
INVENTOR
BERNARD L. LEWIS
BY Hurvitz & Rose
ATTORNEYS United States Patent Office 3,443,098
Patented May 6, 1969

3,443,098
ELECTROSTATICALLY CONTROLLED LIGHT MODULATOR
Bernard L. Lewis, Satellite Beach, Fla., assignor to Radiation Incorporated, Melbourne, Fla., a corporation of Florida
Filed Oct. 21, 1965, Ser. No. 500,030
Int. Cl. H04b 9/00
U.S. Cl. 250—199                    26 Claims

ABSTRACT OF THE DISCLOSURE

A light modulator using a flat sheet of pliable dielectric material which is flowable under pressure but which returns to its original shape as the pressure is released, superposed on a totally internally reflecting flat surface having optical irregularities. Various means are provided to apply pressure to force the dielectric sheet into total contact over the entire reflecting surface despite the optical irregularities.

---

The present invention relates to light modulation and, more particularly, to apparatus for amplitude modulating a pre-formed beam of light by inhibiting total internal reflection at a dielectric interface.

It is well known in the field of optics that, if a beam of light, traveling in a first medium, is caused to impinge upon a plane surface between the first medium and a second medium, part of the beam will be reflected back into the first medium and a part will be transmitted into the second medium. If we denote by $i$ the angle of incidence, i.e., the angle between the incident beam of light and the normal to the plane surface, and by $i'$ the angle of reflection, i.e., the angle between the reflected beam of light and the normal to the plane surface, we know from elementary principles of optics that $i$ will always equal $i'$. However, if we denote by $r$ the angle of refraction, i.e., the angle between the transmitted beam of light and the normal to the surface, $i$ will equal $r$ only if the refractive indices of the two mediums are identical. If the refractive indices of the two mediums are different, the angle of refraction will be different from the angle of incidence. If $n$ and $n'$ are the refractive indices of the first and second mediums, the relationship between $i$ and $r$ may be obtained from Snell's law, which provides that:

$$n \sin i = n' \sin r$$

If $n$ is greater than $n'$, $\sin r$ may become unity when $i$ is still less than 90°. Since it is impossible for $\sin r$ to achieve a value greater than unity, the cases where $\sin r$ would be equal to or greater than one, from Snell's law, represent a change from refraction to total reflection. The value of $i$ where $\sin r$ equals $i$ is known as the critical angle. If a ray strikes the surface at the critical angle, it emerges parallel to the surface. If the ray strikes the surface at an angle which is greater than the critical angle, it will be totally reflected.

It is also well known that the above phenomena of total reflection may be produced with an ordinary right angle optical prism. With such a prism in air, light entering one of the two right angle faces is totally reflected at the internal surface of the hypotenuse. The light enters the prism normal to the first face, is totally reflected by the internal surface of the hypotenuse and exits normal to the second face. This is known as total internal reflection.

A further known fact is that the phenomenon of total inernal reflection is unchanged provided there is at least a one wavelength thick film of air between the hypotenuse of the prism and a suitable surface which is spaced from and parallel to the hypotenuse. However, if a surface is placed closer than one wavelength from the hypotenuse, total internal reflection may be inhibited to any extent, even to the point of 100 percent transmission of light through the hypotenuse.

Many prior art devices have been developed to take advantage of the ability to inhibit or enhance total internal reflection at a dielectric interface. In one prior art device, if a glass surface is brought closer than one wavelength distance from the hypotenuse of the prism, light will pass through the hypotenuse, through the air space and into the second glass surface. When the air space is greater than one wavelength in thickness, total reflection occurs. When the air space is less than one-eighth wavelength thick, the transmission of light through the air space is substantially 100 percent complete. For intermediate values of air space thickness, there will be partial reflection and partial transmission. This technique may then be used to modulate the incident beam of light by driving the glass plate toward or away from the prism hypotenuse in accordance with the magnitude of a modulating signal. A magnetostrictive driving means may be employed to move the glass plate or a piezoelectric crystal may be substituted for the glass plate and the crystal expanded or contracted toward or away from the hypotenuse by the application of a high voltage to the crystal. Reference is here made to Patent No. 2,997,922 to Kaprelian for a further explanation of these techniques.

Additional techniques exist in the prior art for modulating a beam of light by inhibiting total internal reflection at a dielectric interface. Patent No. 2,565,514 to Rajes discloses a system for driving a piezoelectric crystal toward or away from a dielectric interface by using the well known electrostriction effect.

In Patent No. 2,185,379 to Myers et al., total internal reflection is inhibited at any selected point on a reflecting interface by placing a coating of carbon on the hypotenuse of an optical prism. Electrons collected by a metallized mica sheet overlaying the carbon particles cause the particles to be withdrawn from the reflecting interface by electrostatic forces at points of high charge density. The charge is selectively established by an electron gun system and a pair of deflection plates. Normally, the carbon particles are in optical contact with the reflecting interface causing light to be absorbed by the particles. When a particle is withdrawn, however, total internal reflection takes place.

Still other prior art devices are known to inhibit total internal reflection at a dielectric interface. However, these devices, as well as those mentioned above, all have various undesirable qualities. In devices of the type illustrated by Patents 2,997,922 and 2,565,514 the mechanical motion is very small and therefore high tolerance alignment procedures are necessary since the spacings are critical. This results in a unit which is both expensive to fabricate and expensive to purchase. Furthermore, since the glass surface must be able to move from a distance of more than one wavelength from the reflecting surface to a distance of less than one-eighth wavelength, and since the mechanical motion obtainable is small, the bandwidth of a given unit is usually quite small. Additional problems in the prior art systems are that dangerously high driving voltages are often required which are usually derived from expensive transformer driving circuits. Furthermore, the physical components usually limit the cross-sectional area of the light beams and the typical unit has low power handling capabilities due to overheating of the prism under high intensity light conditions. Perhaps a critical difficulty is the requirement for optically flat surfaces.

According to the present invention, these objectional features of the prior art are obviated by substituting for the glass plate or other solid materials a pliable dielectric material. For example, I have found that if a black, pliable, thin, dielectric material is placed over a reflecting interface and forced against the interface, the reflection coefficient of the interface drops in direct proportion to the completeness of contact, i.e., in direct proportion to the force holding the two surfaces together. If all force is removed, a sufficient layer of air will exist between the reflecting interface and the dielectric sheet to permit total internal reflection. However, as a force is applied, pressing the dielectric material up against the reflecting interface, the layer of air is driven out and total internal reflection is inhibited. By varying this force, total internal reflection may be inhibited to any desired extent and a beam of light incident upon the reflecting interface may be amplitude modulated from 0 percent to 100 percent. In a first preferred embodiment of the present invention, the driving force is produced by an electrostatic field which is establlished between two conductors to which a control signal is applied. The black dielectric material is placed between the conductors, one of which conductors is placed adjacent to and in contact with the reflecting interface. The electrostatic field produced presses the black dielectric against the reflecting prism with a force that is proportional to the voltage of the applied control signal.

In a second preferred embodiment of the present invention, the driving force is produced electrically by a loudspeaker or equivalent driving mechanism which causes a black diaphragm or dielectric sheet to move toward or away from the reflecting surface dependent upon the polarity and magnitude of the electrical signal applied to the speaker coil. In this way, the reflection coefficient of the reflecting surface may be varied at will and any light incident upon the surface will be amplitude modulated. If a black diaphragm is used, it will absorb a portion of the incident light preventing heating of the reflection surface. However, for high power signals that would overheat the black diaphragm, a dielectric sheet would be used which will guide a portion of the incident light away from the prism. The guided light will exit from the edges of the dielectric sheet and can be dissipated in space or in a suitable heat sink.

The dielectric layer in the present invention is rubbery in nature. The term "rubbery" is intended to refer to the mechanical property of the surface as soft and pliable so that it flows under pressure to conform with the prism surface, despite the fact that the latter has optical irregularities. Also, like rubber, the dielectric layer is elastic and flowable so that in the absence of pressure it springs back to its original shape and pulls out of conformity with said prism surface. It is not intended to infer by "rubbery" that the dielectric layer must have the visual appearance of rubber. Indeed, as is pointed out in the above paragraph, some considerable advantages may be gained by using a transparent dielectric.

The advantages derived from the above-described preferred embodiments of the present invention will now be more readily understood. The mechanical motions obtainable can be very large and the spacings are no longer critical. This is because the pliable material will flow, under pressure, and provide complete contact with the reflecting interface which no longer has to be an accurately machined surface. As a result, alignment procedures are relatively simple and the unit becomes inexpensive to fabricate and inexpensive to purchase. Furthermore, only standard, easily obtainable parts are required further contributing to the overall low cost of the unit. The large mechanical motion involved results in a unit with unusually wide bandwidth. Also, a small control signal is all that is required which can be derived from a simple, standard transistor circuit. This eliminates the dangerously high voltages required by the prior art systems. Additional advantages of the present invention are that units may be constructed with apertures of any desired size to handle large beams of light and, as explained previously, the device may be made with high power handling capabilities.

The novel structure of the present invention is admirably suited for a multiplicity of uses. In a first use, the present invention may be used as a simple light modulator. In a second use, the techniques of the present invention may be used to construct a highly efficient, high gain optical corner reflector. In a third use, the invention comprises a bent dielectric light guide which may be used as a light valve for optical displays and in which the transmission coefficient of the guide can be varied over wide ranges. In a fourth use, the amplitude modulated beam of light may be used to produce an electrical signal amplifier with stability and high gain. In a fifth use, the techniques of the present invention may be employed to construct a voice modulated light transmitter which may be used as a secure communications link, for example.

It is, therefore, an object of the present invention to provide apparatus for amplitude modulating a pre-formed beam of light by inhibiting total internal reflection at a dielectric interface.

It is a further object of the present invention to provide apparatus for modulating a beam of light by electrostatically forcing a black dielectric material into contact with a reflecting interface.

It is a still further object of the present invention to provide apparatus for modulating a beam of light by electrically forcing a black diaphragm or dielectric sheet toward a reflecting interface.

Another object of the present invention is the provision of an electrically modulated optical corner reflector.

Yet another object of the present invention is the provision of an electromechanically controlled light valve.

Still another object of the present invention is the provision of a light operated electrical amplifier with stability and high gain.

A further object of the present invention is the provision of a voice modulated light transmtter.

The above and still further objects, features and advantages of the present invention will become apparent upon consideration of the following detailed description of one specific embodiment thereof, especially when taken in conjunction with the accompanying drawings, wherein:

FIGURE 1 is a cross-sectional view of an electrostatically controlled light modulator;

FIGURE 2 is a cross-sectional view of an electrically controlled light modulator;

FIGURE 3 is a schematic diagram of a first modification of the device of FIGURE 2;

FIGURE 4 is a cross-sectional view of a light valve according to the present invention;

FIGURE 5 is an end view of the light valve of FIGURE 4;

FIGURE 6 is a schematic diagram of a first modification of the device of FIGURE 1; and FIGURE 7 shows in cross-section a second modification of the device of FIGURE 2.

Referring now to the drawings and, more particularly, to FIGURE 1 thereof, there is shown apparatus for amplitude modulating a beam of light by inhibiting total internal reflection at a dielectric interface. A suitable light source, such as bulb 1, emits light rays 2 which are focused by lens 3 into a light beam of arbitrary cross-section. The light beam is then incident on a first right angle face 4 of an optical prism 5. Since the beam of light is normal to surface 4, the beam will be transmitted into the prism 5 with the angle of refraction equaling the angle of incidence. When the incident beam of light strikes the hypotenuse 6 of optical prism 5, it will be totally reflected in accordance with the above described phenomenon of total internal reflection. After reflection, the reflected beam of light exits prism 5 via the second right angle surface 7.

In accordance with the present invention, if a black pliable material is forced up against reflecting surface 6, the reflection coefficient of surface 6 drops in direct proportion to the completeness of contact, i.e. in direct proportion to the force holding the two surfaces together. In FIGURE 1, this force is produced by the combination of a transparent conductor 8 which is located adjacent to and in contact with reflecting surface 6 and a thin conducting sheet 9 spaced from conductor 8. In between conductors 8 and 9 is located a thin, pliable, black dielectric material 10 which may be, for example, rubber or a suitable plastic material. Conductor 8 may be a thin conducting coating which is painted on reflecting surface 6. A souce of control signals 11 applies a varying D.C. voltage to conductors 8 and 9 via input terminals 12 and 13. The application of a D.C. voltage to conductors 8 and 9 produces an electrostatic field between the two conductors, establishing a force of attraction between them. This field presses the black dielectic 10 against the conducting coating 8 on prism 5 with a force that is proportional to the applied voltage. When the applied voltage is zero, there will be total internal reflection at reflecting surface 6. However, as the voltage is increased, the reflection coefficient of surafce 6 will drop in direct proportion to the force holding black dielectric 10 against conducting coating 8, which force, in turn, is directly proportional to the strength of the electrostatic field which is directly proportional to the magnitude of the applied voltage from source 11. By biasing the applied voltage from source 11 to a D.C. value, by means of a D.C. bias 14, the device of FIGURE 1 may be used to linearly modulate the incident light beam with an applied A.C. voltage from source 11. The reason for D.C. bias 14 is that when the applied voltage is zero, the percentage modulation is already zero and negative going signals will have no effect on the incident beam of light. Accordingly, a D.C. bias must be used which is equal to or greater than the maximum negative excursion of the A.C. control signal.

If high power light is to be modulated with the apparatus of FIGURE 1, the black dielectric sheet 10 may be exchanged for a clear dielectric sheet having a dielectric constant higher than that of the prism 5 and conducting coating 8 at optical frequencies. With this modification, the reflection spoiling action of the dielectric sheet results in the sheet acting as a light guide for the transmitted incident light and the light will exit frm the edge of the sheet to be dissipated in a suitable heat sink.

Referring now to FIGURE 2, there is shown an alternate technique for amplitude modulating a beam of light by forcing a black dielectric material up against a dielectric interface to inhibit total internal reflection. A beam of light 20 of arbitrary cross-section is again incident on a first face 4 of an optical prism 5, totally reflected by hypotenuse 6 and transmitted by face 7. A black diaphragm or dielectric sheet 21 is located over hypotenuse 6. In the embodiment of FIGURE 2, a loudspeaker or equivalent driving means, designated generally as 22, causes the dielectric sheet to move toward or away from the reflecting surface 6 of the prism 5 in direct proportion to the polarity and magnitude of an electrical signal applied to the loudspeaker. The loudspeaker 22 is shown as comprising a frame 23, an electromagnet or permanent magnet 24 attached to the frame 23, a voice coil 25 and a diaphragm 26. A source of control signals 11 applies an electrical signal to voice coil 25 which drives diaphragm 26. The motion of diaphragm 26 causes the black diaphragm or dielectric sheet 21 to move toward or away from the reflecting surface 6. In this way, the reflection coefficient of the prism face 6 can be reduced or increased and a beam of light incident upon surface 6 will be amplitude modulated.

As was the case with the embodiment of FIGURE 1, if a black diaphragm is used in FIGURE 2, it will absorb the portion of the incident beam of light which is transmitted by surface 6. However, for high power signals which would overheat the black diaphragm, the clear dielectric sheet may be used which will guide a portion of the incident light away from the prism to the edges of the sheet. The guided light will then exit from the sheet edges where it may be dissipated in space or in a suitable black heat sink.

The advantages of the devices of FIGURES 1 and 2 should now be obvious. The spacing of the dielectric sheets 10 or 21 is not critical and the mechanical motions obtainable are very large. This results in a unit which is inexpensive to fabricate and one which has a very large bandwidth. Furthermore, the source of control signals 11 and the D.C. bias 14 may be low in magnitude. This eliminates high voltages in favor of standard, low voltage transistor driving circuits. Also, since the components are standard, easily obtainable parts, the units may be designed to handle large light bundles and high powers. None of these features have heretofore been available in prior art light modulators.

Reference is now made to FIGURE 3, wherein is shown an electrically modulated optical corner reflector constructed in accordance with the teachings of the present invention. FIGURE 3 is in all respects identical to FIGURE 2 with the exception of the substitution of an optical corner reflector 30 for the optical prism 5. In FIGURE 3, as in FIGURE 2, electrical control signals from source 11 are applied to voice coil 25 which activates diaphragm 26 to move a black diaphragm 21 toward or away from one of the reflecting faces 31 of the optical corner reflector 30. When the diaphragm 21 is in contact with the surface 31, total internal reflection does not take place and the reflection coefficient of face 31 becomes that of the diaphragm. As the diaphragm 21 moves away from the face 31, the reflection coeffiicent increases and approaches unity as the distance between the diaphragm and surface increases.

Although optical corner reflector 30 has been shown as a triangular corner reflector, it will be appreciated by those skilled in the art that other types of corner reflectors may be used. However, a dihedral or a triangular corner reflector is preferred since all incident rays must reflect from each face in these two cases and only one face need be modulated. If, on the other hand, a five-sided pyramidal corner were used, only 50 percent modulation could be obtained if only one face were driven. In order to achieve 100 percent modulation, two adjacent faces would have to be driven.

The device of FIGURE 3 is admirably suited for aerospace communications where retrodirective reflectors are employed. The device is simple, efficient and has low power and voltage requirements. Furthermore, the device offers high gain and retrodirectivity over wide angles. In other words, the angle of arrival of a beam of light can be anywhere with a 90° solid angle and the system will function with full gain. This fact may be taken advantage of by mounting eight corner reflectors on a space craft to permit coverage of a 360° solid angle. These eight corner reflectors could then be used to modulate a light beam from another space craft or from the earth and return it to the sender with any desired information impressed on it in the form of intensity modulation.

Referring now to FIGURES 4 and 5, there is shown a device for controlling the amount of light transmitted through a light guide which embodies the novel techniques of the present invention. A beam of light 20 is incident normal to a first face 40 of a bent dielectric light guide 41 and, after transmission therethrough, exits normal to a second face 42. Intermediate faces 40 and 42, light guide 41 is bent to provide two reflecting surfaces 43 and 44, located in a manner to intercept light beam 20. Reflecting surfaces 43 and 44 are angled with respect to surfaces 40 and 42 and light beam 20 to provide total internal reflection of light beam 20. An electromechanical transducer 45, such as a piezoelectric crystal, or either of the structures shown in FIGURES 1 and 2, is utilized to force a thin, pliable black material 46 against one or more of the reflecting surfaces, such as surface 43, of the light guide 41 in response to an electrical control signal from source 11. As before, when the black material 46 is in contact with surface 43, the reflection coeffiicent of surface 43 is that of the black material. When contact is broken or partial, however, the reflection coefficient approaches unity in accordance with the phenomenon of total internal reflection. To obtain a greater degree of variation in the transmission coefficient then can be obtained with a single unit 45, a plurality of cascaded similar units may be used spaced along the light guide 41 which would now have multiple bends. Furthermore, to prevent light from by-passing the light guide, light shields, such as shields 47 and 48, may be placed at opposite ends of light guide 41.

A light guide constructed as in FIGURES 4 and 5 eliminates the problems of the prior art units which required careful machining and construction to provide matched reflecting surfaces which were flat and matched to within a small fraction of the wavelength of the light to be used. The present device avoids high tolerance requirements by forcing a pliable absorbing material into contact with a reflecting surface. In this way, the flow of the pliable material under pressure eliminates the need for a highly polished flat surface.

Referring now to FIGURE 6, there is shown an electrical signal amplifier constructed in accordance with the teachings of the present invention. FIGURE 6 is in all respects identical to FIGURE 1 with the exception of the addition of a photo-detector 60, or other photo-sensitive element, located to intercept the modulated beam of light exiting from face 7 of optical prism 5. In this embodiment, a signal from source 11 represents an input signal to be amplified and the output from photo-detector 60 provides the output signal on a lead 61. Amplification is provided in that a low level electrical signal from source 11 is used to amplitude modulate a beam of light to any desired extent by inhibiting total internal reflection at a dielectric interface as explained more fully in connection with FIGURE 1. The modulated beam of light is then reconverted into electrical energy by the application of the beam to a photo-sensitive element. Because the percent modulation of the light beam is independent of the intensity of the light incident upon reflecting surface 6 and in view of the fact that the output of photo-detector 60 is directly proportional to the intensity of the light received by it, high gains may be obtained from the system of FIGURE 6 by simply increasing the light intensity. Furthermore, with the system of FIGURE 6, unconditional stability of the output signal may be obtained since there is no feedback paths between the input and output signals, the beam of light providing complete electrical isolation. Additional isolation may be achieved, if necessary, by using metal screens or physical separation, reference being made to Patent No. 3,153,149 to Finigian for a more complete explanation of the former expedient.

Although the electrostatic technique of FIGURE 1 has been illustrated as the light modulator for the amplifier of FIGURE 6, it will be appreciated that the electrical technique of FIGURE 2 may equally be used to obtain the desired result.

Reference is now made to FIGURE 7 wherein is illustrated a voice modulated transmitter constructed in accordance with the teachings of the present invention. An optical prism 70 is located within a hollow housing 71, the prism being supported at the top and rear of the housing, as shown. At the front of housing 71 is a grill 72 which permits sound waves to communicate between the inside and outside of housing 71. Located behind grill 72 is a diaphragm 73 which is coated with a thin black rubber coating on the side opposite to the one facing grill 72. Diaphragm 73 is so located that the rubber coating thereon is adjacent to surface 74 of optical prism 70. By driving diaphragm 73 into contact with surface 74, the reflection coefficient of surface 74 decreases in direct proportion to the completeness of contact. By directing sound waves through grill 72 onto diaphragm 73, the diaphragm may be subjected to varying pressures caused by the variations of the sound waves. In this manner, the reflection coefficient of surface 74 may be varied in accordance with the changes of these pressures.

In order to utilize this change in reflection coefficient to modulate a beam of light, a light bulb 74 is provided which may be energized by a suitable battery 76. The light from bulb 75 is directed by lens 77 normal to surface 78 of prism 70, whereupon the light beam is transmitted to surface 74. After reflection from surface 74, the light beam is reflected from surface 79 and exits prism 70 normal to surface 80. Surfaces 74 and 79 are angled with respect to surface 78 so as to provide total internal reflection at both of said surfaces. In order to provide a compact unit, light bulb 75 is located within a hollow housing 81 with screw threads 82 at the bottom thereof. Battery 76 is located in a hollow housing 83 with screw threads 84 at the top thereof which are complementary to screw threads 82. Provision of screw threads 82 and 84 permits removal of battery compartment 83 from housing 81 for servicing of bulb 75. The bottom of battery compartment 83 is provided with further screw threads 85 which complement the screw threads 86 of a cap 87. Cap 87 is provided to permit removal of battery 76. A spring 88 attached to cap 87 so as to force battery 76 against bulb 75 when cap is in place.

The device as shown in FIGURE 7 provides an efficient modulator of a beam of light. By speaking into grill 72, the sound waves produced vibrate diaphragm 73 to inhibit total internal reflection at interface 74. The modulated beam of light exits at surface 80 into space in a known direction and can be used to communicate speech to a remote location where the light beam is received and demodulated. Most other such devices use conventional microphones, the signals from which are amplified and used to modulaate the current through a light source. However, these devices are inefficient due to the thermal time constant of the light source and the power required by the amplifiers. The present invention, however, avoids these difficulties by using a highly efficient, low power light modulator.

While I have described and illustrated one specific embodiment of my invention, it will be clear that variations of the details of construction which are specifically illustrated and described may be resorted to without departing from the true spirit and scope of the invention as defined in the appended claims.

I claim:

1. A light modulator for use in a first medium comprising:
   a second medium having at least one plane surface having substantial failure of optical flatness and a dielectric constant which is greater than that of said first medium;
   means projecting a beam of light through said second medium onto said plane surface at an angle equal to or greater than the critical angle so that said beam of light is totally reflected by said plane surface;

a flat sheet of material superposed on said plane surface, said sheet of material being fabricated of pliable flowable dielectric material having a dielectric constant selected to inhibit total internal reflection of light passing through said second medium toward said surface when said sheet is in total contact with said surface and having sufficient pliablity and flow capability to conform optically over the entirety of the flat surface when sufficient externally applied pressure is applied to said sheet despite the failure of optical flatness; and means operatively associated with said pliable dielectric sheet for forcing a wide area of said sheet simultaneously into contact with said plane surface to modify total reflection of said beam of light at said plane surface thereby to intensity modulate said beam of light, despite said failure of optical flatness.

2. The light modulator according to claim 1 wherein said second medium is an optical prism having a pair of right angle surfaces and a hypotenuse and wherein said at least one plane surface is said hypotenuse.

3. The light modulator according to claim 1 wherein said pliable dielectric sheet consists of a thin, black dielectric material.

4. The light modulator according to claim 3 wherein said black dielectric material is rubber.

5. The light modulator according to claim 1 wherein said pliable dielectric sheet comprises an optically clear dielectric sheet having a dielectric constant which is greater than that of said second medium.

6. The light modulator according to claim 1 wherein said means for forcing said pliable dielectric sheet into contact with said plane surface comprises:

a transparent conductor in contact with said plane surface;

a conducting sheet spaced from and parallel to said transparent conductor, said pliable dielectric sheet being located between said transparent conductor and said conducting sheets; and means for applying a varying D.C. voltage between said transparent conductor and said conducting sheet to produce an electrostatic field between said conductor and said conducting sheet whereby said field forces said pliable dielectric sheet into contact with said transparent conductor.

7. The light modulator according to claim 6 further comprising:

means for biasing said D.C. voltage to a value sufficient to partially inhibit total reflection at said plane surface.

8. The light modulator according to claim 6 wherein said transparent conductor comprises a thin conducting coating which is painted on said plane surface.

9. The light modulator according to claim 1 wherein said means for forcing said pliable dielectric sheet into contact with said plane surface comprises:

a loudspeaker having a frame in contact with said plane surface, a diaphragm connected to said frame and spaced from said dielectric sheet and a voice coil connected to said diaphragm; and means for applying a varying D.C. voltage to said voice coil to drive said diaphragm, the motion of said diaphragm forcing said pliable dielectric sheet into contact with said plane surface.

10. The light modulator according to claim 1 wherein said second medium is an optical corner reflector having at least two mutually perpendicular reflecting surfaces and wherein said pliable dielectric sheet is located parallel to one of said at least two mutually perpendicular reflecting surfaces.

11. The light modulator according to claim 10 wherein said means for forcing said pliable dielectric sheet into contact with said plane surface comprises:

a transparent conductor in contact with said plane surface;

a conducting sheet spaced from and parallel to said transparent conductor, said pliable dielectric sheet being located between said transparent conductor and said conducting sheets; and means for applying a varying D.C. voltage between said transparent conductor and said conducting sheet to produce an electrostatic field between said conductor and said conducting sheet whereby said field forces said pliable dielectric sheet into contact with said transparent conductor.

12. The light modulator according to claim 10 wherein said means for forcing said pliable dielectric sheet into contact with said plane surface comprises:

a loudspeaker having a frame in contact with said plane surface, a diaphragm connected to said frame and spaced from said dielectric sheet and a voice coil connected to said diaphragm; and means for applying a varying D.C. voltage to said voice coil to drive said diaphragm, the motion of said diaphragm forcing said pliable dielectric sheet into contact with said plane surface.

13. The light modulator according to claim 1 wherein said second medium comprises a dielectric light guide having an inlet end, an outlet end and at least one bend intermediate said ends, said bend providing two reflecting surfaces, and wherein said beam of light is projected through said inlet end to said outlet end via said two reflecting surfaces.

14. The light modulator according to claim 13 wherein said pliable dielectric sheet is located parallel to and spaced from one of said two reflecting surfaces and wherein said means for forcing said pliable dielectric sheet into contact with said plane surface comprises:

an electromechanical transducer in contact with said dielectric sheet for moving said sheet in response to an electrical signal; and means for applying a varying D.C. voltage to said transducer to actuate same.

15. The light modulator according to claim 14 wherein said electromechanical transducer consists of a piezoelectric crystal.

16. The light modulator according to claim 13 further comprising:

a pair of light shields, one of said light shields being located between said inlet end and said bend and the other of said light shields being located between said outlet end and said bend, for preventing light from bypassing said light guide.

17. The light modulator according to claim 13 wherein said dielectric light guide having at least one bend comprises a dielectric light guide having a plurality of cascaded bends and wherein a plurality of pliable dielectric sheets are provided spaced from and parallel to a reflecting surface of each of said bends.

18. The light modulator according to claim 13 wherein said pliable dielectric sheet is located parallel to and spaced from one of said two reflecting surfaces and wherein said means for forcing said sheet into contact with said plane surface comprises:

a transparent conductor in contact with said one of said two reflecting surfaces;

a conducting sheet spaced from and parallel to said transparent conductor, said pliable dielectric sheet being located between said transparent conductor and said conducting sheets; and means for applying a varying D.C. voltage between said transparent conductor and said conducting sheet to produce an electrostatic field between said conductor and said conducting sheet whereby said field forces said pliable dielectric sheet into contact with said transparent conductor.

19. An electrical signal amplifier comprising:

a light modulator for use in a first medium comprising:
a second medium having at least one plane surface having substantial failure of optical flatness and a dielectric constant which is greater than that of said first medium;
means projecting a beam of light through said second medium onto said plane surface at an angle equal to or greater than the critical angle so that said beam of light is totally reflected by said plane surface;
a flat sheet of material superposed on said plane surface, said sheet of material being fabricated of material being fabricated of pliable flowable dielectric material having a dielectric constant selected to inhibit total internal reflection of light passing through said second medium toward said surface when said sheet is in total contact with said surface and having sufficient pliability and flow capability to conform optically over the entirety of the flat surface when sufficient externally applied pressure is applied to said sheet despite the failure of optical flatness; and
means operatively associated with said pliable dielectric sheet for forcing a wide area of said sheet simultaneously into contact with said plane surface to modify total reflection of said beam of light at said plane surface thereby to intensity modulate said beam of light despite said failure of optical flatness;
a source of input signals to be amplified connected to said means for forcing said sheet into contact with said plane surface; and
a photo sensitive element for receiving said beam of light after reflection from said plane surface and for converting said intensity modulated beam of light into an electrical signal.

20. The electrical signal amplifier according to claim 19 wherein said means for forcing said pliable dielectric sheet into contact with said plane surface comprises:
a transparent conductor in contact with said plane surface;
a conducting sheet spaced from and parallel to said transparent conductor, said pliable dielectric sheet being located between said transparent conductor and said conducting sheets; and
means for applying a varying D.C. voltage between said transparent conductor and said conducting sheet to produce an electrostatic field between said conductor and said conducting sheet whereby said field forces said pliable dielectric sheet into contact with said transparent conductor.

21. The electrical signal amplifier according to claim 19 wherein said means for forcing said pliable dielectric sheet into contact with said plane surface comprises:
a loudspeaker having a frame in contact with said plane surface, a diaphragm connected to said frame and spaced from said dielectric sheet and a voice coil connected to said diaphragm; and
means for applying a varying D.C. voltage to said voice coil to drive said diaphragm, the motion of said diaphragm forcing said pliable dielectric sheet into contact with said plane surface.

22. The light modulator according to claim 1 wherein said second medium comprises an optical prism having at least one plane reflecting surface, and wherein said means projecting a beam of light onto said plane surface comprises:
a voltage operated source of light;
a source of voltage connected to said source of light; and
a lens operative to intercept the light from said source of light for fanning and projecting a beam of light onto said plane reflecting surface; and wherein said pliable dielectric sheet comprises:
a flexible diaphragm coated with a thin black dielectric material, said coated diaphragm being spaced from said plane reflecting surface; and wherein said means for forcing said sheet into contact with said plane surface comprises:
voice produced sound waves incident upon said diaphragm.

23. A body of optical material having a predetermined dielectric constant and having a flat surface, said flat surface having optical irregularities:
a flat sheet of material superposed on said flat surface, said flat sheet of material being fabricated of pliable flowable dielectric material having a dielectric constant selected to provide total absorption of light passing through said body toward said surface when said flat sheet is in total contact with said flat surface and having sufficient pliability and flow capability to conform optically over the entirety of said flat surface despite the optical irregularities of the latter when subject to pressure toward said flat surface,
electric motor means for applying uniform mechanical pressure over said flat sheet tending to force said flat sheet as a whole uniformly against said flat surface,
a source of light,
means directing said light through said body of optical material against said flat surface and for collecting light reflected therefrom, and
a source of electrical control signal connected to said electric motor means for driving said electric motor means with a force which is a function of the amplitude of said electrical control signal,
said flat plate being sufficiently pliable and flowable to be compressed as a whole uniformly toward total contact with said surface in accordance with said force sufficiently to adjustably modulate the directed light uniformly over said flat surface and to relax from said total contact when said force is reduced.

24. A light modulator for use in a first medium, comprising an optical element having an external surface, the index of refraction of the element at said surface being greater than that of said first medium:
means for projecting a beam of light through said optical element onto said external surface at an angle equal to or greater than the critical angle so that said beam of light is totally internally reflected by said external surface,
an optical contact element made of material having a rubbery textured surface and having an index of refraction at said surface which is greater than the index of refraction of said first medium so that when said optical contact element is forced within one eighth wave length of said external surface total internal reflection is inhibited,
means for applying an external force to said optical contact element for increasing the pressure between the external surface of the optical element and the surface of the optical contact element so as to bring about a degree of inhibition of total internal reflection which is directly proportional to the force applied.

25. The light modulator of claim 24 in which the optical contact element is made of a transparent material.

26. A light modulator for use in a first medium comprising:
an optical element having at least one external surface which is not optically flat and having an index of refraction at that external surface which is greater than that of said first medium,
means for bringing about total internal reflection of light propagating through said optical element and impinging on said external surface when said external surface is in the presence of said first medium,
a transparent pliable dielectric sheet located within the first medium spaced from and parallel to the external surface of said optical element, said sheet being made of a transparent material having an index of refraction which is greater than the index of refraction of said optical element at said external surface, the surface of said transparent dielectric sheet being totally internally reflecting so that light transmitted from said optical element is guided along said transparent sheet and exits from the edges of said sheet, and pressure means for forcing said dielectric sheet into contact with an extensive external surface of said optical element despite its lack of optical flatness to inhibit total internal reflection by permitting light to be transmitted into said dielectric sheet.

References Cited

UNITED STATES PATENTS

| | | | |
|---|---|---|---|
| 235,199 | 12/1880 | Bell | 350—285 |
| 2,185,379 | 1/1940 | Myers | 350—285 |
| 2,281,280 | 4/1942 | Garbor. | |
| 2,455,763 | 12/1948 | Harrison | 350—285 |
| 3,001,015 | 9/1961 | Weiss | 178—7.85 |

ROBERT L. GRIFFIN, *Primary Examiner.*

ALBERT J. MAYER, *Assistant Examiner.*

U.S. Cl. X.R.

350—160, 285; 332—7.51